United States Patent [19]

Hilsley

[11] 3,743,790

[45] July 3, 1973

[54] TEE CONNECTION CIRCUIT FOR PCM TELEPHONE TRANSMISSION SYSTEMS

[75] Inventor: Royston William Hilsley, Great Baddow, Essex, England

[73] Assignee: The Marconi Company Limited, London, England

[22] Filed: May 28, 1971

[21] Appl. No.: 147,731

[30] Foreign Application Priority Data

June 4, 1970 Great Britain .................. 26,932/70

[52] U.S. Cl. ......................... 179/18 BC, 179/15 AV

[51] Int. Cl. ............................................ H04m 3/56

[58] Field of Search .................. 179/18 BC, 18 BH, 179/15 AV, 1 CN

[56] References Cited

UNITED STATES PATENTS 3,530,246 9/1970 Kelly et al. ....................... 179/1 CN
3,274,342 9/1966 Brightman ...................... 179/18 BC
3,500,441 3/1970 Brolin ........................... 179/15 AV
3,180,939 4/1965 Hall.............................. 179/15 AV
3,612,772 10/1971 Lerouge et al. ................ 179/18 BC

*Primary Examiner*—Thomas W. Brown
*Attorney*—Baldwin, Wight & Brown

[57] ABSTRACT

A pulse code modulated telephony transmission arrangement provides a facility which enables an operator to "tee" across an established connection between two subscribers without breaking the connection and without reducing the quality and audibility of the connection. The telephony transmission data from the subscribers and operator is of nonlinearly coded digital form and each is independently converted to linear coded digital signals which are then additionally mixed as required and thereafter converted back to the original nonlinearly coded digital form to permit the operator to speak to the subscribers, or to monitor the conversation. The digital mixing ensures both that no clicks will be heard by the subscribers, and that no reduction of signal level is produced when a "tee" connection is made.

3 Claims, 3 Drawing Figures

2 Sheets-Sheet 1

Figure 1:
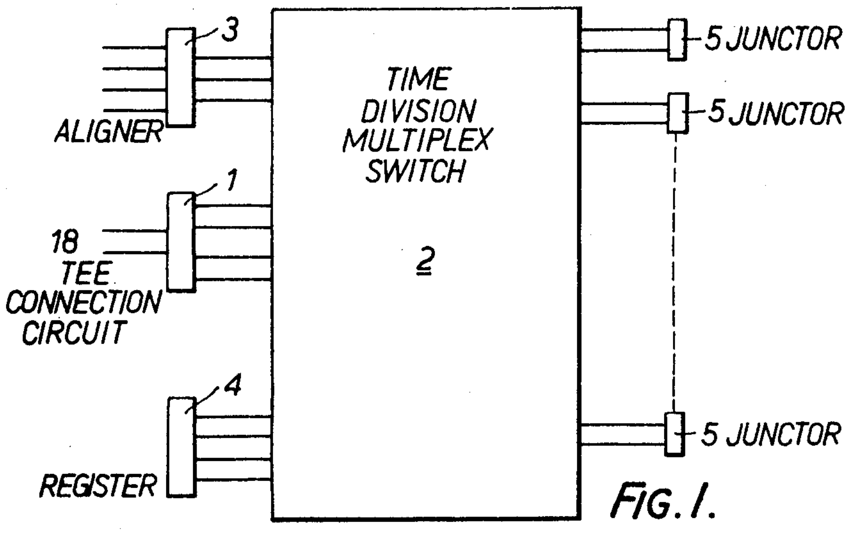

INVENTOR
Royston William Hilsley
BY
Baldwin Wight x Brown
ATTORNEYS

INVENTOR
Rayston William Wilsley
BY
Baldwin Wight x Brown
ATTORNEYS

TEE CONNECTION CIRCUIT FOR PCM TELEPHONE TRANSMISSION SYSTEMS

The present invention relates to data transmission arrangements and more particularly to telephony data transmission arrangements employing pulse code modulated (P.C.M) digital signals.

In telephony transmission arrangement it is often necessary for a third party, e.g. an operator, to be able to "tee" across an established connection between two subscribers, i.e. to make a "tee" connection such that the operator may speak to either subscriber without breaking the connection between the subscribers. This has been done in previous arrangements by simply connecting the third party "tee" input to a connecting path between the two subscribers which connecting path is carrying analogue speech signal traffic. Making such a simple connection, however, has the disadvantage that it introduces a 3 dB drop in the signal level passing between the subscribers since at the "tee" connection half the power which would normally go to a subscriber is passed to the third party at the "tee" input. Because there is a drop in power on the line the switching-in of a "tee" connection is also auidible to the subscribers on the connection.

The invention seeks to provide means for providing a "tee" connection for a pulse code modulation telephone transmission arrangement in which the abovementioned disadvantages are substantially avoided.

According to this invention a "tee" connection circuit for a pulse code modulation telephone transmission arrangement comprises means for adding to digital signals passing from either subscriber to the other input digital signals from the "tee" input.

Normally in p.c.m. telephone transmission systems companding is used, i.e. in the analog-to-digital conversion and the digital-to-analog conversion the relationship between the coded signals and the voltage levels represented thereby is non-linear and in such cases it is necessary for the "tee" connection circuit to include expanding means for converting the nonlinearly coded signals into linearly coded signals prior to their addition and compressing means for converting the summed linear digital signals into nonlinear signals prior to the added signals being transmitted to said other subscriber.

In the preferred embodiment the "tee" connection circuit includes, for each direction path between the two subscribers, a sequential connection comprising in the order stated expanding means, adding means and compressing means; further adding means connected to add the outputs of the expanding means of the two sequential connections, the output of the further adding means being connected to feed its output to the third party connection via further compressing means; and further expanding means for expanding and feeding signals from the third party connection to both of the adding means of said two sequential circuits.

Preferably the adding means is arranged such that if the addition sum is of larger magnitude than the maximum value representable by the normal code then the count in excess of the maximum value is ignored and a count equal to the maximum value is transmitted.

Preferably, one operator will have a signal "tee" connection circuit which may be connectable into any one of a plurality of connection paths. For this purpose, the "tee" connection apparatus will be connected via individual inhibit gates to all of the paths and each path will have a "tee" connection by-pass inhibit gate therein such that by applying suitable gating signals to the inhibit gates of a path the connection can by-pass the "tee" connection or be connected therethrough.

Commonly, when the "tee" connection circuit is used to enable an operator or engineer to "tee" in to a connection between two subscribers, the subscribers' connections of the "tee" connection circuit will be coupled to a time division multiplex switching arrangement and the third party connection will be coupled directly to the operator or the engineer. The "tee" connection circuit may, however, be used to provide a "trunk offer" (T.K.O) facility and for this purpose the third party connection will also be coupled to the time division multiplex switching arrangement.

Figure 2:
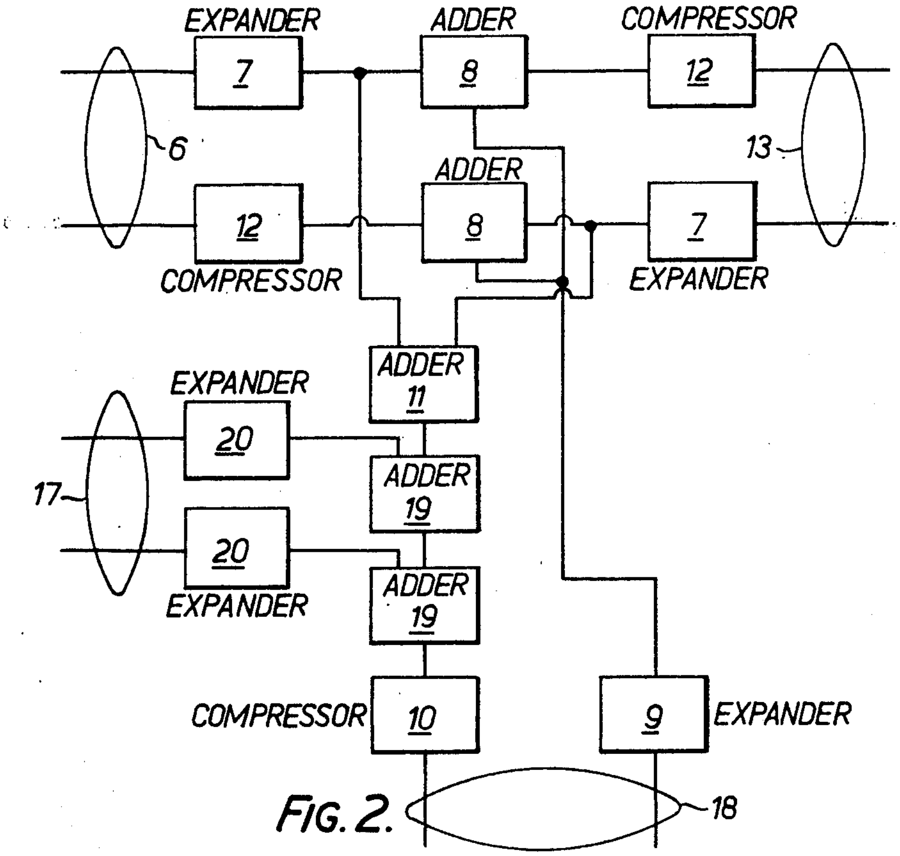
Figure 3:
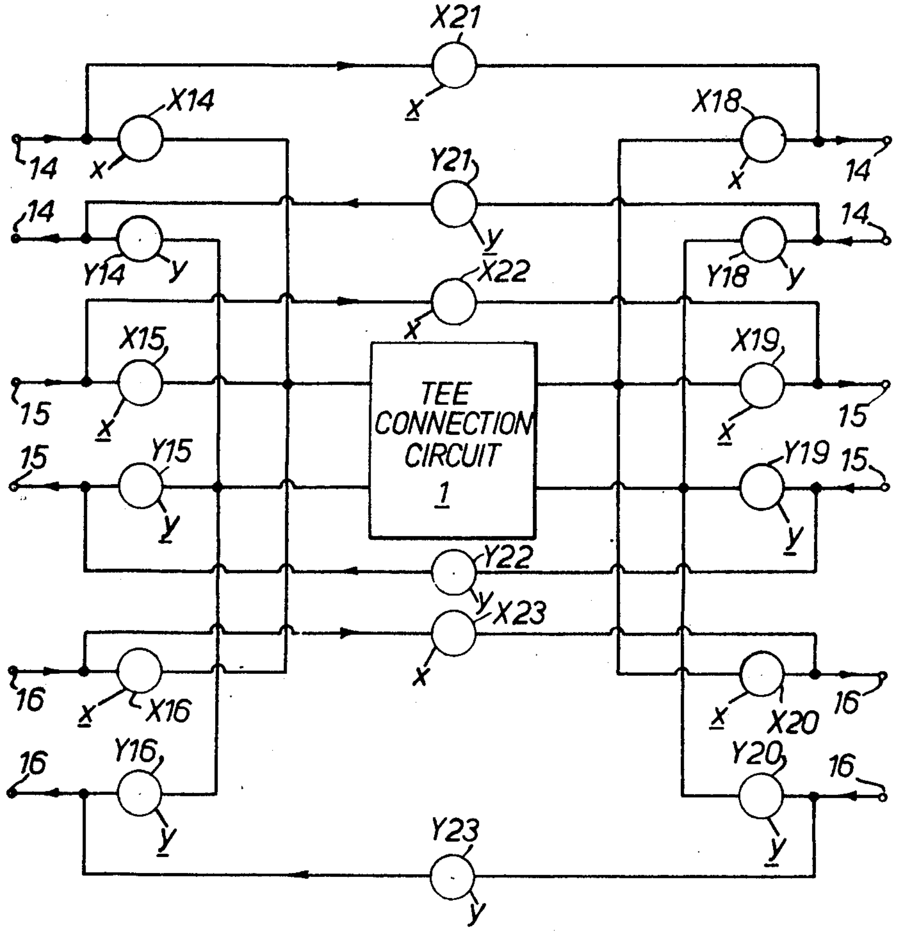

The invention will now be described with reference to the accompanying drawings in which, by way of example, FIG. 1 shows in simplified block diagrammatic form a telephone transmission arrangement incorporating an operator's "tee" connection circuit according to the invention, FIG. 2 shows in more detail the "tee" connection circuit of FIG. 1 and FIG. 3 shows an operator's "tee" connection circuit connected to a plurality of subscribers connection paths.

FIG. 1 shows in greatly simplified form, for the sake of clarity, part of a telephone transmission arrangement, similar to that described in U.K. Pat. 1,300,421. In this figure a "tee" connection circuit 1 is connected to one side of a time division multiplex switch arrangement 2. Also connected to the same side of the switch arrangement 2 are an aligner 3 and a register 4. To the other side of the switch are connected a plurality of junctor pairs 5. Only one aligner 3, one register 4 and one "tee" connection circuit 1 are shown although in practice there would be a plurality of each.

The switch arrangement 2 comprises a plurality of individual switch units so that a connection between any two inputs thereto may follow any of a large number of paths. As is more fully explained in the abovementioned co-pending application, when a subscriber makes a telephone connection to another subscriber the call connection path may be established from one subscriber through an aligner 3, through one of the available paths in the switch 2, through a junctor pair 5, back through another available path in the switch 2 and back through an aligner 3 to the other subscriber. This is the form of connection path set up if the call is to be made without supervision by an operator. If, however, the call requires operator supervision over the operator connection 18 then the call is made via an aligner 3, the switch arrangement 2, a junctor pair 5, back through the switch 2 to a "tee" connection circuit 1, then back from the "tee" connection circuit, through the switch 2 to a second junctor pair 5 and then back through the switch 2 and aligner 3 to the other subscriber. If the "tee" connection circuit is to be used for trunk offer (T.K.O) purposes instead of direct operator supervision then the connection 18 is coupled directly back to the switch arrangement 2 so that the mixed subscribers' signals can be routed therethrough for utilisation as required.

The "tee" connection circuit of FIG. 1 is shown in more detail in FIG. 2. The "tee" connection circuit has two sequential connections between subscribers' terminals 6, to which one subscriber is connected and subscribers' terminals 13 to which the other subscriber is connected. Each of the sequential connections comprises an expander 7, an adding circuit 8 and a compressor 12. The input terminal of the third party's or operator's terminals 18 is connected to a further expander 9, the output of which is in turn connected to an input of each adding circuit 8. A further adding circuit 11 has its two inputs connected each to one of the two outputs of the expanders 7 and its output is connected via two additional adding circuits 19 to a compressor 10, the output of which is connected to the output terminal of the operator's connection. Each of the additional adding circuits 19 has a second input from an additional expander 20 coupled to an input terminal 17.

In operation the signals appearing at input terminals of the subscribers' terminals 6 and 13 are nonlinear P.C.M. signals containing eight digits per signal word. Linearly coded in binary form it takes twelve digits to represent the voltage levels represented by the eight digits of the nonlinear signals and the expanders 7 are arranged to convert into 12 digit linearly coded signals the eight bit words fed thereto. The 12 bit linearly coded words are passed from each expander 7 both to the associated adding circuit 8 and to the further adding circuit 11. Adding circuit 11 sums the two signals thereto and passes these via the adding circuits to the compressor 10. This compressor operates in the reverse manner to an expander and converts the twelve bit words it receives into eight bit nonlinearly coded words and these eight bit words are then passed to the operators' equipment. By means of the additional adding circuits 19 further signals can be added to the output signals from the adding circuit 11, these further signals being received in eight bit form at input 17 and expanded by expander 20 prior to the addition. Signals from the operator will also be in eight bit nonlinearly coded form and these are expanded by expander 9 into a twelve bit linear code and fed direct to the adding circuits 8. There they are added to the signals from the expander 7 and the combined signals are passed by the compressors 12 to the subscribers output terminals at 6 and 13.

Each of the adding circuits is a straightforward binary adding circuit and it adds or mixes the two signals appearing at its two inputs. However, the maximum number of digits which this system can handle is 12 so that if the addition sum results in a binary number greater in length than 12 bits then those bits exceeding twelve are ignored and a twelve bit number equal to the maximum value representable thereby (i.e. 12 binary '1's)is sent to the compressor. If the addition number does not exceed the maximum number representable by the twelve binary digits then the straightforward addition number is output from the adding circuit.

With this arrangement, therefore, the signals from each subscriber are combined digitally by adding circuit 11 and passed to the operator who can therefore hear each subscriber. Similarly the operators signals are added to each subscriber's signals in the adding circuits 8 so that each subscriber can hear the operator in addition to the other subscriber. Obviously switching arrangements may be provided, if desired, such that the operator can select to speak to one subscriber solely without the other hearing the conversation. The inputs 17 are provided for monitoring purposes. Signals from other connections may be passed to these inputs to enable the operator to monitor these calls. By reducing the amplitude level of these signals they will not prevent the operator hearing clearly the conversation between the subscribers connected to inputs 6 and 13 but he will still be able to hear the conversation relayed in input 17. This amplitude reduction may be effected in 6dB steps by dividing the outputs of the expanders 20 by 2 for each step, e.g. by shifting the output by one digit position. He does not have the facility, however, with this circuit to speak to the subscribers connected to inputs 17. If, as a result of his monitoring he wishes to speak to the parties on inputs 17 he will have to use a separate connection circuit or switch the present circuit to the appropriate connection path.

Since in the above-described "tee" connection circuit the mixing or "teeing" of the signals of a subscriber and the operator are performed digitally no clicks will be heard by the subscribers nor will there be a reduction of signal level when a "tee" connection is made.

The arrangement of FIG. 3 shows how one operator "tee" connection circuit 1 may be utilised to provide a "tee" connection facility for three subscribers connections. In this figure there are shown three two-way subscribers connection paths 14, 15 and 16. In each connection the path from left to right in the drawing contains gates referenced X and the path from right to left contains gates referenced Y. Each path 14, 15 and 16 has an X direction bypass gate X21, X22 or X23 respectively and a Y direction bypass gate Y21, Y22, Y23 respectively. In addition, the paths have X direction input gates X14, X15, X16 and X direction output gates X18, X19, X20 respectively and Y direction input gates Y18, Y19, Y20 and Y output gates Y14, Y15, Y16 respectively. All the gates have inhibiting inputs and are constructed such that if a signal of one potential is applied to the inhibiting input, signals are permitted to pass through the gate whereas if a signal of the opposite potential is applied to the inhibiting input the passage of signals through the gate is blocked.

When, as represented in the figure, a "tee" connection is to be made to connection circuit 14, then a signal of one polarity *x* will be applied to the inhibit inputs of gates X14 and X18 and a signal *y* of the same polarity will be applied to the gates Y14 and Y18. The inverse of the signals *x* and *y*, i.e. *x* and *y*, will be applied to the inhibit inputs of the gates X21 and Y21. Signals going along the path 14 will, therefore, be fed, via the gates X14 and Y18 into, and via the gates X18 and Y14, out of the "tee" connecting circuit 1 and will be prevented from passing through the bypass gates X21 and Y21. At the same time the gates X15, X16, X19 and X20 will have an inhibiting input *x* and the gates Y15, Y16, Y19 and Y20 will have an inhibiting input *y* applied thereto. Also the gates X22 and X23 will have an input *x* and the gates Y22 and Y23 an input *y* applied thereto so that the signals on paths 15 and 16 will be prevented from reaching the connection circuit 1 which will be bypassed by the gates X22, X23, Y22 and Y23.

I claim:

1. A "tee" connection circuit for adding signals in a PCM telephone transmission system in which a selected nonlinearly coded format is used, comprising in combination:

first, second and third terminal pairs, one terminal of each pair receiving PCM voice signals of said selected nonlinearly coded format and the other terminal of each pair transmitting PCM voice signals of said selected nonlinearly coded format, a first serial path connected between said one terminal of said first terminal pair and said other terminal of said second terminal pair, a second serial path connected between said one terminal of said second terminal pair and said other terminal of said first terminal pair;

each serial path containing in the order stated; expander means for converting the nonlinearly coded PCM voice signals fed to it to corresponding linearly coded PCM signals; adder means for summing linearly coded PCM signals fed to it; compressor means for converting linearly coded PCM signals received thereby to transmitted PCM voice signals of said selected nonlinearly coded format;

further adder means connected to receive both linearly coded PCM signals provided by the expander means of each said first and said second serial paths for summing these signals;

further compressor means connected to said further adder means for converting summed linearly coded PCM signals provided by said further adder means to the nonlinearly coded format, and connected to supply these signals to said other terminal of the third terminal pair;

further expander means for converting the nonlinearly coded signals received at the said one terminal of said third terminal pair to corresponding linearly coded PCM signals, which are fed to both of said adder means of said first and said second serial paths.

2. A "tee" connection circuit as defined in claim 1 including means for selectively connecting said one terminal of said first pair directly to said other terminal of said second pair and said other terminal of said first pair of said one terminal of said second pair.

3. A "tee" connection circuit as defined in claim 2 wherein the means last mentioned comprises inhibit gates.

* * * * *